US012771600B2

(12) United States Patent
Leuschner

(10) Patent No.: US 12,771,600 B2
(45) Date of Patent: Oct. 20, 2026

(54) SERVICE MANAGEMENT

(71) Applicant: Telia Company AB, Solna (SE)

(72) Inventor: Daniel Leuschner, Gothenburg (SE)

(73) Assignee: TELIA COMPANY AB, Solna (SE)

( * ) Notice: Subject to any disclaimer, the term of this patent is extended or adjusted under 35 U.S.C. 154(b) by 66 days.

(21) Appl. No.: 18/896,182

(22) Filed: Sep. 25, 2024

(65) Prior Publication Data

US 2025/0106106 A1 Mar. 27, 2025

(30) Foreign Application Priority Data

Sep. 27, 2023 (FI) ...................................... 20236066

(51) Int. Cl.
*H04L 41/084* (2022.01)

(52) U.S. Cl.
CPC ................................ *H04L 41/0843* (2013.01)

(58) Field of Classification Search
CPC .......................... H04L 41/084; H04L 41/0843
See application file for complete search history.

(56) References Cited

U.S. PATENT DOCUMENTS 10,353,729 B1 * 7/2019 Bell .......................... G06F 8/20
11,755,559 B1 9/2023 Tankersley et al.
2006/0209797 A1 * 9/2006 Anisimov ........... H04M 7/1255 370/352
2009/0109959 A1 4/2009 Elliott et al.
2009/0307378 A1 * 12/2009 Allen ...................... H04L 47/36 710/4
2014/0282586 A1 9/2014 Shear et al.
2017/0041404 A1 * 2/2017 Burbridge ............. H04L 47/125
2017/0201850 A1 7/2017 Raleigh et al.
2018/0349482 A1 12/2018 Oliner et al.
2018/0365309 A1 12/2018 Oliner et al.
2020/0137177 A1 4/2020 Chunduru Venkata et al.
2021/0211356 A1 * 7/2021 Gati ......................... H04L 41/22
2021/0250239 A1 * 8/2021 Kancharla ............ G06Q 20/108
2023/0199028 A1 * 6/2023 Ho ....................... G06F 16/2458 726/1

(Continued)

OTHER PUBLICATIONS

Search Report, issued in European Patent Application No. 24202398 dated Feb. 5, 2025.

(Continued)

*Primary Examiner* — Joshua Joo
(74) *Attorney, Agent, or Firm* — NIXON & VANDERHYE

(57) ABSTRACT

An apparatus, a computer program product, and a computer-implemented method for managing service related requests, where the method includes selecting a category storing the service related requests ended up to an erroneous state; determining data identifying one of the service related requests; generating an inquiry through an application programming interface to a network entity, the inquiry carrying the data identifying the one service related request; applying a predefined template to include data descriptive of the service related request failed to cause the match with the data accessible by the network entity; and generating a request to an external network being responsible for the service requested with the service related request, where the request is generated by transferring the template to the external network.

9 Claims, 2 Drawing Sheets

(56) References Cited

U.S. PATENT DOCUMENTS

| | | | | |
|---|---|---|---|---|
| 2024/0152379 | A1* | 5/2024 | Krishna | H04L 63/0263 |
| 2024/0160514 | A1* | 5/2024 | Zhang | G06F 11/0793 |
| 2025/0021987 | A1* | 1/2025 | Williams | G06F 18/23 |

OTHER PUBLICATIONS

Search Report for FI Application No. 20236066 dated Apr. 15, 2024, 2 pages.

* cited by examiner

SERVICE MANAGEMENT

CROSS-REFERENCE TO RELATED APPLICATIONS

This application claims priority to FI patent application Ser. No. 20/236,066 filed Sep. 27, 2023, the entire contents of which are hereby incorporated by reference.

TECHNICAL FIELD

The invention concerns in general the technical field of telecommunications. More particularly, the invention concerns service management in the telecommunication networks.

BACKGROUND

Customers of telecommunication networks continuously update their service portfolio acquired from the service provider, such as from a telecom operator. The updates in the service portfolio may relate to acquisition or abandonment of certain service(s) as well as modification of the services already in use. The customer teams handling these update requests get easily loaded with the requests also due to that the end customers wish to get updates on the situation of a delivery, such as a schedule, of the requested services and that also takes its share in terms of time from the customer teams.

The above given situation is especially challenging when the requested update to the service requires communication between a first service provider having a customer interface and another service provider actually delivering the service e.g. through the first service provider. This results that the first service provider may, upon a receipt of an inquiry from the end customer, only provide very limited information in relation to the delivery of the service since the first service provider cannot access the other networks for finding out the actual situation with the service provision with respect to the end user in question.

Thus, there is room for introducing novel approaches to mitigate at least in part the challenges as described above and to improve service management.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a computer-implemented method, an apparatus and a computer program for managing service related requests.

The objects of the invention are reached by a computer-implemented method, an apparatus and a computer program as defined by the respective independent claims.

According to a first aspect, a computer-implemented method for managing service related requests is provided wherein the service related requests are handled with a request management system and wherein the service related requests are managed by categorizing them in accordance with a state of an accomplishment of the service related request, the method comprises:

- selecting a category storing the service related requests ended up to an erroneous state due to a busy port situation in the accomplishment of the service related request,
- determining data identifying one service related request ended up to the erroneous state due to the busy port situation,
- generating an inquiry through an application programming interface to a network entity, the inquiry carrying the data identifying the at least one service related request,
- applying, in response to a detection of a receipt of information indicative on that the inquiry failed to generate a match with data accessible by the network entity, a predefined template to include data descriptive of the service related request failed to cause the match with the data accessible by the network entity,
- generating a request to an external network being responsible for the service requested with the service related request, the request is generated by transferring the template to the external network.

The method may further comprise:

- generating, in response to a detection of a receipt of information indicative on that the inquiry generated a match with data accessible by the network entity, a response to update the respective service related request with an information indicative on an instant of time related to the inquiry.

A re-generation of the inquiry through an application programming interface may be prevented until a predefined amount of time has lapsed from the instant of time related to the inquiry.

Moreover, the determination of the data identifying the one service related request may comprise a retrieval of an identifier of the respective service related request.

According to a second aspect, an apparatus for managing service related requests is provided wherein the service related requests are managed by categorizing them in accordance with a state of an accomplishment of the service related request, the apparatus is configured to perform:

- select a category storing the service related requests ended up to an erroneous state due to a busy port situation in the accomplishment of the service related request,
- determine data identifying one service related request ended up to the erroneous state due to the busy port situation,
- generate an inquiry through an application programming interface to a network entity, the inquiry carrying the data identifying the at least one service related request,
- apply, in response to a detection of a receipt of information indicative on that the inquiry failed to generate a match with data accessible by the network entity, a predefined template to include data descriptive of the service related request failed to cause the match with the data accessible by the network entity,
- generate a request to an external network being responsible for the service requested with the service related request, the request is generated by transferring the template to the external network.

The apparatus may further be configured to perform:

- generate, in response to a detection of a receipt of information indicative on that the inquiry generated a match with data accessible by the network entity, a response to update the respective service related request with an information indicative on an instant of time related to the inquiry.

Moreover, the apparatus may be configured to prevent a re-generation of the inquiry through an application programming interface until a predefined amount of time has lapsed from the instant of time related to the inquiry.

The apparatus may also be configured to retrieve an identifier of the respective service related request in the determination of the data identifying the one service related request.

According to a third aspect, a computer program is provided, the computer program comprising instructions which, when executed by a computer, cause the computer to perform the method according to the first aspect as defined above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
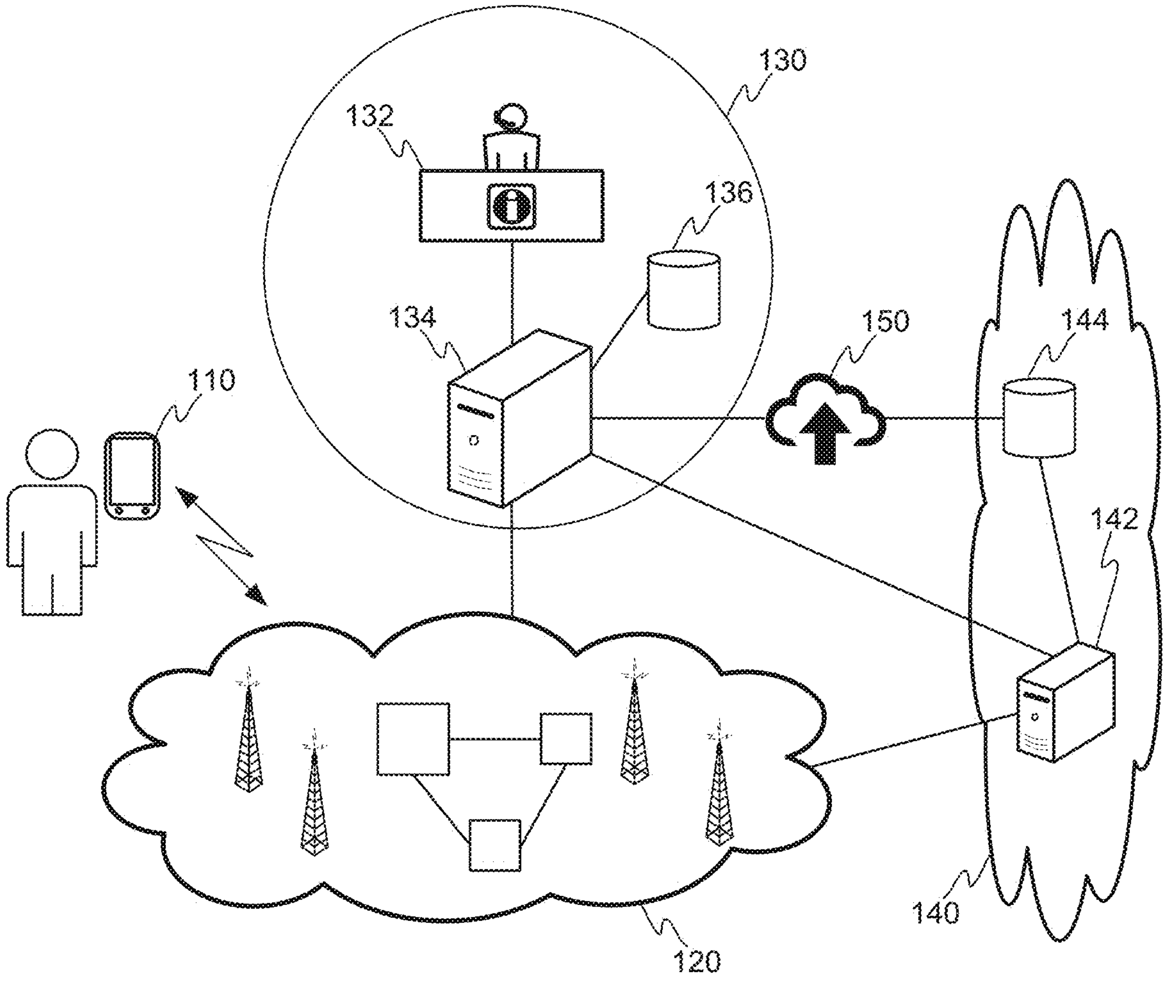
FIG. 1 illustrates schematically a communication system according to an example.

FIG. 1 illustrates schematically at least some entities involved in an environment in which the present invention may be implemented to. For the purpose of describing at least some aspects of the present invention it may be assumed that a user possesses a user device 110 which may e.g. be a mobile phone, a tablet computer, a laptop computer, or a personal computer. Depending on the type of the user device 110 it may be equipped with a subscriber identity module, SIM, enabling an access to a communication network, such as a mobile communication network. The user terminal 110 may request a certain service from a customer management system 130 dedicated to the user of the user device 110 e.g. based on the subscription of the user device 110. The connection to the customer management system 130 may be established by any known manner, such as through a web page, through a call connection, through any messaging system, or with any combination of these or similar approaches. The customer management system 130 may comprise one or more customer service agents 132 providing the customer service with any known tools, such as with a computer and/or as a call service by using applicable application thereto. The terminal device(s) of the customer agents 132 may be communicatively connected to one or more computing devices, such as computers and/or servers, which one or more computing devices are configured to operate as a request management system 134. The customer management system 130 may also comprise one or more databases 136 arranged to store data in relation to the customer management. The data stored in the database(s) 136 may comprise, but is not limited to, customer related data, such as contact details and so on, but also service related data e.g. defining the services in use by each customer. The customer management system 130 may be communicatively connected to the communication network 120 with known communication technologies in order to receive information from the communication network 120 but also delivering information, e.g. with control signals, towards the communication network 120.

As mentioned above the user terminal 110 may request a certain service from a customer management system 130 wherein it may be detected that the requested service is managed, such as provided, by an external network denoted with 140 in FIG. 1. In other words, the external network 140 may manage the service provision of the service in the communication network 120 or the service may be provided from the external network 140 over the communication network 120 to the user device 110. In order to request such a service from the external network 140 the customer management system 130, such as the request management system 134 therein, and the external network 140 may perform communication over a communication channel established between the respective entities. In the external network 140 side the service management, such as the service provision, may be performed with one or more computing devices 142, such as computers and/or servers. The external network 140 may also comprise other network entities 144 than the number of computing devices 142. The other network entities 144 may e.g. be databases or other data storages. The network entities 144 indicated to be inside the external network 140 may also reside outside the external network 140 in some embodiments, i.e. in some other networks or similar and are provided with a communication connection thereto.

FIG. 1 also illustrates an application programming interface, API, 150 between the customer management system 130, specifically the service request system 134, and an external entity 144 for enabling a specific type of communication in accordance with the present invention as is described in the forthcoming description.

It is worthwhile to mention that FIG. 1 illustrates only some portions of the mentioned entities and further elements are also present in the respective entities. For example, it is clear that the customer management system 130 may be communicatively connected to a plurality of external networks 140 e.g. corresponding to the one schematically illustrated in FIG. 1, which external networks 140 may manage, and provide, different services available to the user devices 110. FIG. 1 is aimed to be kept simple and to illustrate at least those entities that enable a description of at least some aspects of the present invention.

Now, in general terms the operation in the service management of users, and the user devices 110, occurs so that the service management system 130 generates requests towards the external network 140 in case the management of the service in question is performed by the external network 140. The requests are generated through a dedicated mechanism and the requests define various parameters with respect to services requested from the external network 140. The external network 140 may respond to the requests from the customer management system 130 and give various indications descriptive of the state of the service management with respect to the request. The indications given in the responses may be descriptive e.g. on the following:

a) the port through which the service is provided is active but it is occupied by another party (e.g. another customer management system 130 or another customer),
b) the port through which the service is provided is active and available for orders,
c) the port through which the service is provided is inactive (e.g. not installed).

The option a) may also be understood as a busy state which corresponds to that the requested service cannot be managed in the external network 140 for the time being so that the service may be provided to the user of the user device 110.

As a non-limiting example, the management of the service requests in the customer management system 130 may e.g. be performed with a ticket-based mechanism which refers to a so-called request management system in which the service requests are managed with so-called tickets comprising information in relation to the service requests. The tickets may e.g. be generated upon a receipt of the service request from the user of the user device 110 and maintained in the database 136 of the customer management system 130 e.g. under control of the request management system 134 which together may execute the request management system as mentioned above. In response to a receipt of the response from the external network 140 to the service request the ticket in question is updated according to the received information which may e.g. comprise data descriptive of the state of the service request wherein the state may correspond to the information defined in the above mentioned items a), b), and c) above. The maintenance of the tickets may be arranged by categorizing the tickets in accordance with the state of the tickets to different categories wherein the categories may e.g. correspond to the states defined in the items a), b), and c) above. At least one category is such that it maintains tickets having the busy state, i.e. the port through which the service is provided is active but it is occupied by another party as defined in the item a) above. For sake of clarity it is worthwhile to understand that the implementation of the request management system and the management of service related requests with the tickets therein is a non-limiting example and also other implementations may be used.

Figure 2:
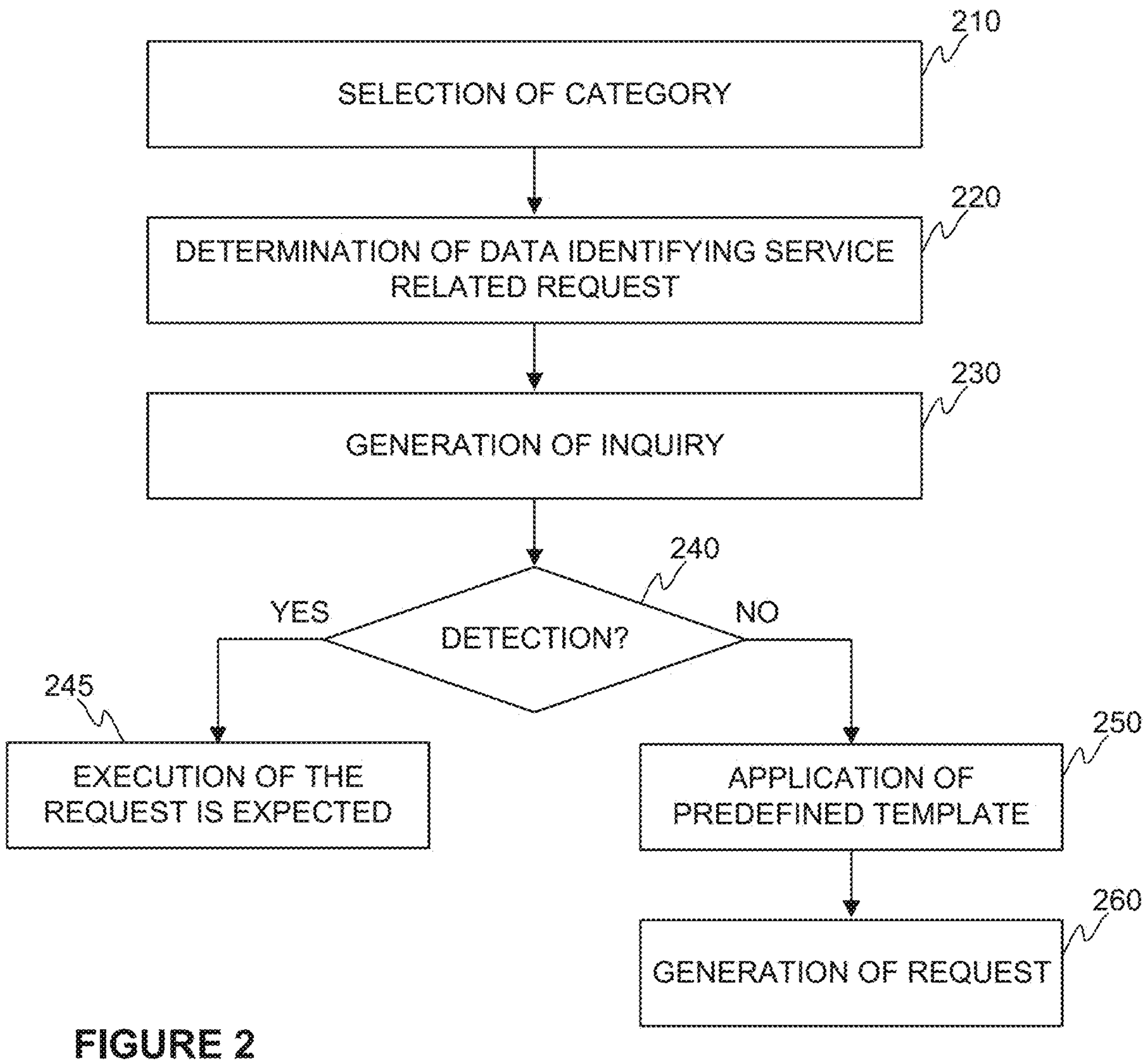
FIG. 2 illustrates schematically a method according to an example.

Next, a computer-implemented method for managing service related requests is described by referring to FIG. 2 schematically illustrating an example of the method according to an embodiment. The service related requests are handled with a request management system 134 and wherein the service related requests are managed by categorizing them in accordance with a state of an accomplishment of the service related request. The data of the different categories may e.g. be stored in a database 136 accessible to the request management system 134. In other words, the request management system 134 may be configured to carry out tasks to meet requests received from customers. This may require a generation of the signals, such as requests and/or control signals to various entities, such as to the external networks 140 and computing devices 142 therein configured to be involved in service provision. The request management system 134 receives the responses and is configured to store them to various predefined categories in accordance with the outcome of the accomplishment of the service requests as described in the foregoing description.

First in the method, a category that is configured to store the service related requests ended up to an erroneous state due to a busy port situation in the accomplishment of the service related requests is selected 210. The selection of the category may correspond to that the computing device of the request management system 134 selects a category corresponding to the erroneous state due to the busy port situation based e.g. on predefined parameters identifying the respective category and accesses the category in order to become aware of the content in the category. Here, the term 'content' may refer to data entries in the category. For example, the data entries may be stored as data files in a folder arranged to store the data in the respective category and the computing device accesses the folder when instructed to execute the method as defined.

Next, the request management system 134 is configured to determine 220 data identifying one service related request ended up to the erroneous state due to the busy port situation. The determination 220 of the data identifying the one service related request may comprise an operation by means of which the request management system 134 retrieves data from the respective file, or another data format, which comprises data identifying the service related request behind the data wherein such data may be an identifier of the request in question. For example, the request management system 134 may be configured to generate and assign an identifier to all requests received by it and insert it to the stored data and apply it in any further requests e.g. towards the external network(s) 140. The whole system may be arranged to operate so that the assigned identifier is carried in signals between the different entities and, thus, the data entries storing the information on the erroneous states due to the busy port situation also stores the identifier as described. As a result, the request management system 134 may determine the data identifying the service related request from which the erroneous state resulted. For sake of completeness, the identifier applied for the purpose as described may be generated in any known manner and e.g. carry data identifying at least in part the party originally requesting the service management or it may be a random identifier and/or so on.

In response to the determination 220 of the data identifying one service related request ended up to the erroneous state due to the busy port situation the request management system 134 is configured to generate 230 an inquiry through an application programming interface 150 to a network entity 144. The inquiry carries at least the data identifying the at least one service related request. The purpose of the generation 230 of the inquiry is to search if the network entity 144 maintains a data record matching with the data identifying the service related request ended up to the erroneous state selected for the clearance in the step 220. In other words, the request management system 134 may inquire at least with the identifier if the network entity 144 comprises data corresponding to the identifier. The data may be stored in a data storage configured e.g. to implement a database. In accordance with at least some embodiments of the invention the request management system 134 is configured to detect 240 if the response to the inquiry indicates that such a data record is found from the network entity 144 or that such a data record is not present in the network entity 144 and a detection result accordingly is generated by the request management system 134. The interpretation of the detection results may be performed so that if the data record is present in the network entity 144 it corresponds to a situation that the request is under processing and it is to be executed. In other words, the data record is in place and is to be processed at some point. This is indicated in FIG. 2 with the reference 245. On the other hand, if the detection result is indicative on that no such data record is present in the network entity 144 it corresponds to that the erroneous state due to the busy port situation is valid.

The detection 240 that the data record in question is present and to be executed as expected may also comprise a step that a response indicative to the detection 240 is generated. In other words, the request management system 134 may be configured to generate such a response to a relevant entity. The generation of the response shall be understood in a broad manner that it may comprise, but is not limited to, an update of the respective data in the service related request in the data storage 136 wherein the update may e.g. comprise a step in which e.g. a time stamp is added, or updated, therein e.g. to indicate the instant of time related to the inquiry, wherein the instant of time may be descriptive of the instant of time the inquiry is performed and/or the instant of time of the response when the status update is received from the network entity 144. The instant of time stored in the data storage 136 may e.g. be applied in delaying the generation 230 of the next inquiry through the application programming interface until a predefined amount of time has lapsed.

In accordance with the invention the request management system 134 is configured to apply 250, in response to the detection 240 of the receipt of information indicative on that the inquiry failed to generate a match with data accessible by the network entity 144, a predefined template to include data descriptive of the service related request that failed to cause the match with the data accessible by the network entity 144. The predefined template is used in order to guarantee that necessary information is delivered to the recipient, i.e. to the external network 140, and the responsible computing device therein, in order to resolve the erroneous state due to the busy port situation with respect to the service related request in question. In other words, the predefined template provides a tool to improve efficiency in the resolution of the described situation. The predefined template is such that it comprises data descriptive of the service related request that failed to cause the match with the data accessible by the network entity 144. For example, the identifier may be included in the template to a predefined field therein but also other data. As a non-limiting example, the template may comprise various kinds of other data e.g. relating to the customer (cf. the user of the user device 110) requesting the service, or the service modification. It may comprise contact details, such as an address, of the user, definition of a premises into which the service is requested (cf. apartment type), and so on.

In response to the application 250 of the predefined template in a required manner i.e. that it includes all the necessary data the request management system 134 is configured to generate 260 a request to the external network 140 being responsible for the service requested with the service related request wherein the request is generated 260 by transferring the template to the external network 140. The recipient of the template in the external network 140 may e.g. be the computing device 142 being responsible for performing operations in order to enable an access to the requested service which may be the same entity arranged to execute the requested service.

For sake of clarity it is worthwhile to mention that even if it is provided in the description herein that the inquiry through the application programming interface, API, is performed to the network entity 144 an implementation according to some embodiments of the invention may be such that the network entity 144 is configured to inquire the information from another entity, such as from the computing device 142 of the external network 140. The entity towards which the further inquiry is made responds to the inquiry with a predefined information and delivers it to the network entity 144 so as to provide the information over the API to the request management system 134 for performing the detection 240 as described.

Figure 3:
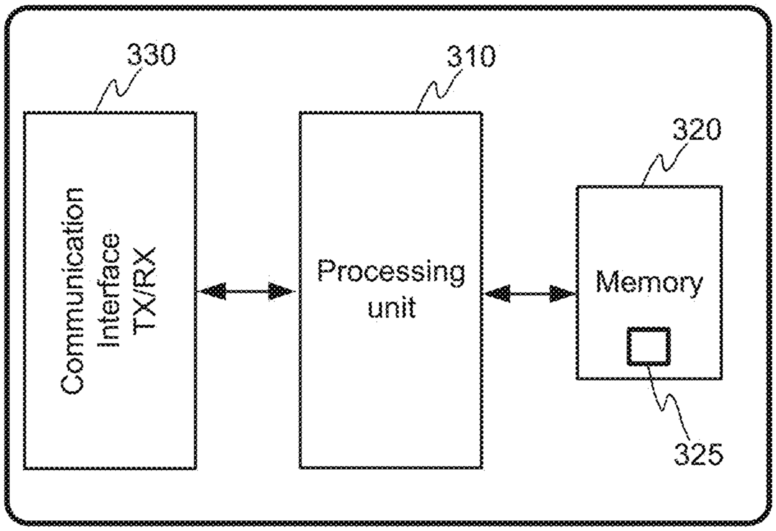
FIG. 3 illustrates schematically a computing apparatus according to an example.

In the description herein it is referred to various entities configured to implement various functions as described. Here, we refer at least to the request management system 134, but also to the computing device 142 and the network entity 144. The respective entities may be implemented with one or more apparatuses suitable for practicing the embodiments as described. A non-limiting example of suitable computing apparatus is schematically illustrated in FIG. 3. In other words, the apparatus may be configured to implement at least part of the method as described. The execution of the respective method, or at least some portions of it, may be achieved by arranging a processing unit 310 comprising at least one processor to execute at least some portion of computer program code 325 stored in at least one memory 320 causing the processor 310, and, thus, the apparatus to implement the method steps as described in order to execute the function as described. In other words, the processing unit 310 may be arranged to access the memory 320 and to retrieve and to store any information therefrom and thereto. Moreover, the processing unit 310 may be configured to control a communication through one or more communication interfaces 330 for accessing the other entities being involved in the operation, such as the data storage and the other nodes/devices in a manner as described in the description herein. Hence, the communication interface 330 may be arranged to implement, possibly under control of the processing unit 310, a number of communication protocols, such as an IP or any other communication protocol, for communicating with one or more entities to receive input and to output data as described. The term communication interface 330 shall be understood in a broad manner comprising necessary hardware and software elements for implementing the communication techniques. Further, the apparatus in question may comprise one or more input/output devices for inputting and outputting information. In accordance with the present invention such input/output devices forming a user interface may at least comprise a touch screen, but may also comprise further entities, such as a physical keyboard, buttons, display, loudspeaker, microphone camera and so on. In some implementation of the apparatus at least some of the in-put/output devices may be external to the apparatus and coupled to it either wirelessly or in a wired manner. For sake of clarity, the processing unit 310 herein refers to any unit or a plurality of units suitable for processing information and control the operation of the apparatus in general at least in part, among other tasks. The mentioned operations may e.g. be implemented with a microcontroller solution with embedded software. Similarly, the invention is not limited to a certain type of memory 320, but any memory unit or a plurality of memory units suitable for storing the described pieces of information, such as portions of computer program code and/or parameters, may be applied in the context of the present invention. Moreover, at least the mentioned entities may be arranged to be at least communicatively coupled to each other with an internal data connection, such as with a data bus.

In some examples, the apparatus may be implemented with a distributed computing environment in which a plurality of computing devices is configured to cooperate to cause an execution of the method according to at least one of the examples as described. A non-limiting example of such a distributed computing system may be that a first apparatus is configured to perform one or more steps of the respective method, and a second apparatus, and any further apparatuses, in turn, may be configured to perform the remaining steps needed to complete operation as described.

As derivable from above, some aspects of the present invention may relate to a computer program product which, when executed by at least one processor, cause an apparatus to perform at least some portions of the method as described. For example, the computer program product may comprise at least one computer-readable non-transitory medium having the computer program code 325 stored thereon. The computer-readable non-transitory medium may comprise a memory device or a record medium such as a CD-ROM, a DVD, a Blu-ray disc, or another article of manufacture that tangibly embodies the computer program. As another example, the computer program may be provided as a signal configured to reliably transfer the computer program.

Still further, the computer program code 325 may comprise a proprietary application, such as computer program code for generating the data record in the manner as described.

The computer program code 325 may also be considered to include the definitions and instructions of an execution of the method.

The invention as described brings various advantages over the prior art solution in the field of service management. Primarily, the solution according to the invention improves a monitoring of the service related requests in order to confirm that they are completed in a due course and, thus, that the end customers receives service with high quality. Additionally, from the process point of view the efficiency in the arrangement of the requested service is improved since the operation is automated e.g. with the predefined template and, thus, the communication between the request management system and the external network is improved.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A computer-implemented method for managing service related requests, comprising:

handling the service related requests with a request management system, managing the service related requests by categorizing the service related requests in accordance with a state of an accomplishment of each of the service related requests, selecting a category storing each of the service related requests ended up to an erroneous state due to a busy port situation in the accomplishment of each of the service related requests, determining data identifying one of the service related requests ended up to the erroneous state due to the busy port situation, generating an inquiry through an application programming interface to a network entity, the inquiry carrying the data identifying the one of the service related an inquiry through an application requests, applying, in response to a detection of a receipt of information indicative on that the inquiry failed to generate a match with data accessible by the network entity, a predefined template to include data descriptive of one of the service related requests failed to cause the match with the data accessible by the network entity, and generating a request to an external network being responsible for the service requested with one of the service related requests, the request being generated by transferring the template to the external network.

2. The method according to claim 1, the method further comprises:

generating, in response to a detection of a receipt of information indicative on that the inquiry generated a match with data accessible by the network entity, a response to update a respective one service related request with an information indicative on an instant of time related to the inquiry.

3. The method according to claim 2, wherein a re-generation of the inquiry through an application programming interface is prevented until a predefined amount of time has lapsed from the instant of time related to the inquiry.

4. The method according to claim 1, wherein the determination of the data identifying the one service related request comprises a retrieval of an identifier of the one service related request.

5. An apparatus for managing service related requests wherein the service related requests are managed by categorizing the service related requests in accordance with a state of an accomplishment of each of the service related requests, the apparatus is configured to perform:

select a category storing each of the service related requests ended up to an erroneous state due to a busy port situation in the accomplishment of each of the service related requests, determine data identifying one of the service related requests ended up to the erroneous state due to the busy port situation, generate an inquiry through an application programming interface to a network entity, the inquiry carrying the data identifying the one of the service related requests, apply, in response to a detection of a receipt of information indicative on that the inquiry failed to generate a match with data accessible by the network entity, a predefined template to include data descriptive of one of the service related requests failed to cause the match with the data accessible by the network entity, and generate a request to an external network being responsible for the service requested with one of the service related requests, the request being generated by transferring the template to the external network.

6. The apparatus according to claim 5, the apparatus further configured to perform:

generate, in response to a detection of a receipt of information indicative on that the inquiry generated a match with data accessible by the network entity, a response to update a respective one service related request with an information indicative on an instant of time related to the inquiry.

7. The apparatus according to claim 6, wherein the apparatus is configured to prevent a re-generation of the inquiry through an application programming interface until a predefined amount of time has lapsed from the instant of time related to the inquiry.

8. The apparatus according to claim 5, wherein the apparatus is configured to retrieve an identifier of the one service related request in the determination of the data identifying the one service related request.

9. A computer program product comprising at least one non-transitory computer-readable storage medium having computer-executable program code instructions stored therein, the program code instructions being configured, when the computer program product is executed on a computer, to cause the computer to at least:

select a category storing service related requests ended up to an erroneous state due to a busy port situation in the accomplishment of the service related requests, determine data identifying one of the service related requests ended up to the erroneous state due to the busy port situation, generate an inquiry through an application programming interface to a network entity, the inquiry carrying the data identifying the one of the service related requests, apply, in response to a detection of a receipt of information indicative on that the inquiry failed to generate a match with data accessible by the network entity, a predefined template to include data descriptive of one of the service related requests failed to cause the match with the data accessible by the network entity, and generate a request to an external network being responsible for the service requested with one of the service related requests, the request being generated by transferring the template to the external network.

* * * * *